Dec. 15, 1931.  E. W. JOHNSON  1,836,172
POTATO DIGGING MACHINE
Original Filed Nov. 15, 1926
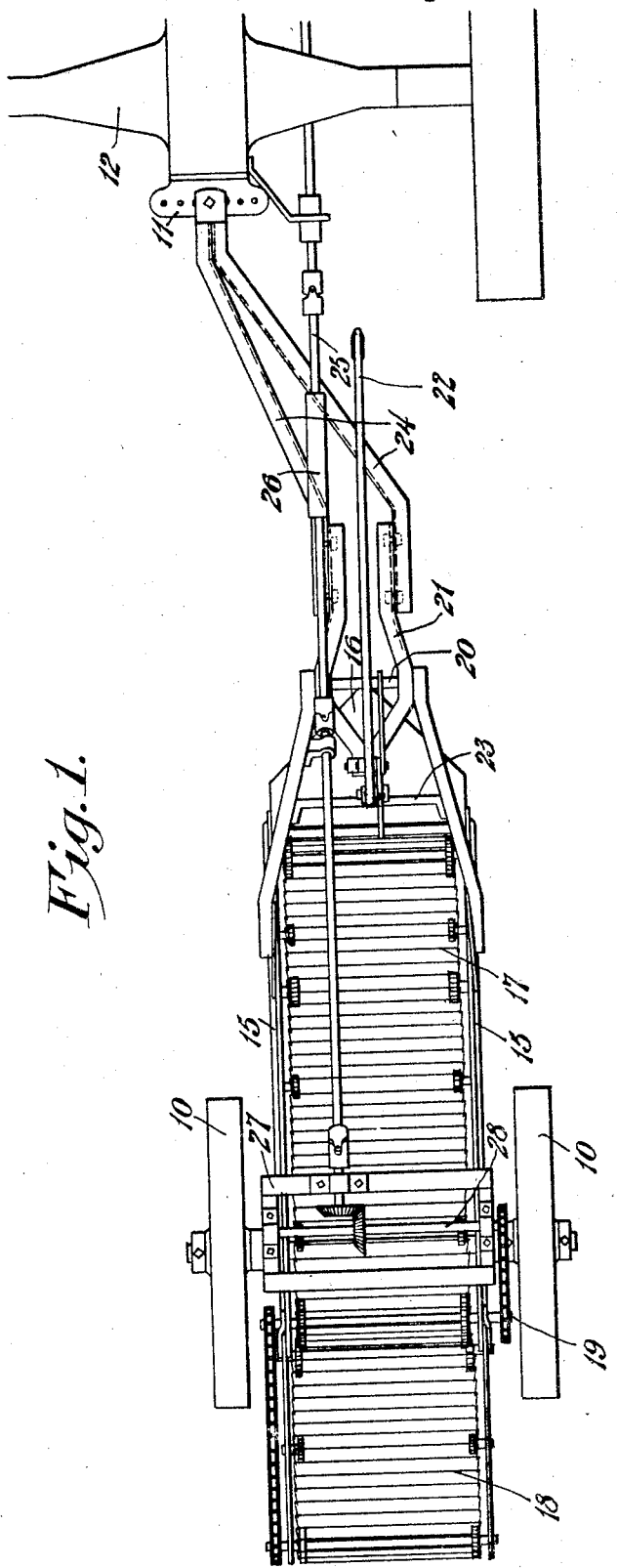
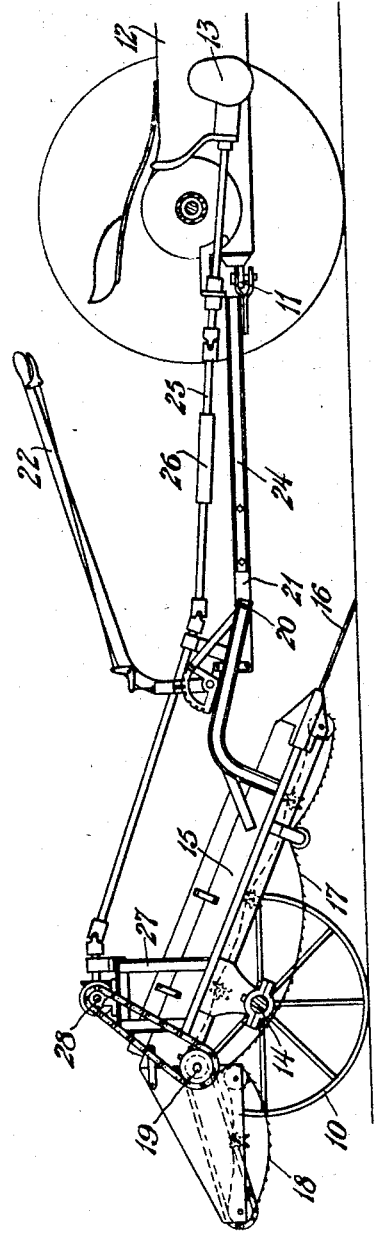
INVENTOR
E. W. Johnson,
BY
Siggers & Adams
ATTORNEYS Patented Dec. 15, 1931

1,836,172

UNITED STATES PATENT OFFICE

ELMO W. JOHNSON, OF HICKSVILLE, NEW YORK, ASSIGNOR TO SYRACUSE CHILLED PLOW COMPANY, INC., OF SYRACUSE, NEW YORK, A CORPORATION OF NEW YORK

POTATO DIGGING MACHINE

Original application filed November 15, 1926, Serial No. 148,454, now Patent No. 1,721,122. Divided and this application filed April 26, 1929. Serial No. 358,323.

This invention relates to potato digging machines and among other objects, aims to provide an improved, single row, digger attachment adapted to straddle one of the rows of plants straddled by the usual farm tractor and having provision to be driven by the power take-off of the tractor, this application being a division of my copending application, Ser. No. 148,454, filed November 15, 1926, now Patent No. 1,721,122.

In the accompanying drawings:

Fig. 1 is a top plan view of the preferred embodiment of the invention showing it applied to the rear of a farm tractor; and Fig. 2 is a side elevation of the digger shown in Fig. 1.

Referring particularly to the drawings, the digger there shown is mounted on ground wheels 10 adapted to straddle a single row of plants and is hitched in offset relation to the draw bar plate or cap 11 on the differential housing of a farm tractor 12 which straddles two rows. The idea is to draw the digger behind one side of longitudinal center line of the tractor. Further, the digger mechanism is connected to be driven by the usual power take-off 13 on the tractor so that it can be operated to clean off débris or trash while the tractor and the machines are standing still. Herein, the digger is shown as being offset on the right hand side of the tractor, but it is distinctly understood that it may be offset on either side, depending upon the row to be dug.

The digger mechanism, which may be of any well known type, is shown as being pivotally supported on the axle 14 by a main frame 15 and includes the usual digger teeth or shovel 16 mounted in front of an inclined elevator 17 and the elevator delivers the potatoes to a rear endless conveyor 18. The arrangement is such that the frame may be raised and lowered to adjust the depth of digging and the digger may be raised above the ground. Further, both the elevators are adapted to be driven by a transverse shaft 19 mounted in suitable bearings near the rear end of the frame of the machine.

Herein, the front end of the frame 15 has a transverse bar 20 connecting the opposite side frame members and a yoke frame 21 is pivotally mounted on this bar. A raising and lowering lever 22 is arranged on the rear end of the yoke and is connected to a transverse bar 23 on the digger frame, as clearly described in my aforesaid patent. The forward end of the yoke member is shown as being rigidly secured to the rear ends of offset or bent draw bars or draft bars 24, which in turn, are pivotally connected to the draw bar cap 11 on the tractor. It is obvious that the bent draw bars may be straight and connected to a tractor draw bar extending across the rear end of the tractor, so that the digger may be hitched on either side. Further, the bent draw bar may be turned over to offset the digger on the other side.

The driving connections between the power take-off and the digger include a universal, articulated, jack shaft 25 having a telescopic section 26 between the rear end of the tractor and the digger. The idea of the telescoping section is to permit the digger to be adjusted and to swing with respect to the tractor. The rear end of the jack shaft is journaled on a super-structure 27 mounted on the frame 15 and drives a counter-shaft 28, which in turn, is connected conveniently by sprockets and a chain to drive the shaft 19. This arrangement of the driving mechanism above the main frame of the digger prevents the jack shaft and the gearing including the sprockets and chain, from becoming clogged or jammed with trash and dirt.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. A single-row potato digger attachment for tractors adapted to straddle two rows and having a power take-off comprising, in combination, a wheel supported frame; digging and elevating mechanism on the frame; power transmitting gearing on the frame; a universal drive shaft for the gearing extending forwardly from the frame and adapted to be connected to the power take-off of a tractor; and an offset hitch including a bent draft bar for connecting the digger directly to the rear end of the tractor, whereby the digger will straddle one of two rows straddled by the tractor.

2. In combination with a tractor having wheels adapted to straddle two rows of plants and provided with a power take-off, a single row potato digger having a bent draft bar connected to the draw bar plate of the tractor so that the digger straddles one of the rows; and a universal drive shaft for the digger detachably connected to the power take-off of the tractor.

3. In combination with a farm tractor adapted to straddle two rows and having power take-off, a wheeled potato digger attachment having an offset hitch pivotally connected to the tractor draw bar substantially on the longitudinal center line of the tractor; and an articulated universal shaft having a telescoping section connected to drive the digger mechanism from the power take-off.

4. In combination with a tractor adapted to straddle two rows and having a power take-off, a single-row potato digger unit having a bent draw bar for pivotally connecting the unit directly to the tractor and so arranged that the digger may be offset with respect to the center line of the tractor at one side and straddle one of the rows; and a universal drive shaft for the digger detachably connected above the bent draw bar and between the longitudinal center lines of the implement and the tractor.

In testimony, that I claim the foregoing as my own, I have hereto affixed my signature.

ELMO W. JOHNSON.